(12) United States Patent
Nelson et al.

(10) Patent No.: US 8,433,058 B2
(45) Date of Patent: Apr. 30, 2013

(54) METHOD AND SYSTEM FOR DISTRIBUTED SPEAKERPHONE ECHO CANCELLATION

(75) Inventors: Norman Nelson, Freehold, NJ (US); Brian K. Dinicola, Monroe Township, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1252 days.

(21) Appl. No.: 12/188,719

(22) Filed: Aug. 8, 2008

(65) Prior Publication Data

US 2010/0034372 A1    Feb. 11, 2010

(51) Int. Cl.
*H04M 9/08* (2006.01)
*H04M 1/00* (2006.01)

(52) U.S. Cl.
USPC ..................................... 379/406.01; 455/570

(58) Field of Classification Search . 379/406.01–406.16
See application file for complete search history.

(56) References Cited

U.S. PATENT DOCUMENTS

| | | | | |
|---|---|---|---|---|
| 5,341,374 A * | 8/1994 | Lewen et al. | ................ | 370/450 |
| 5,721,923 A * | 2/1998 | Hamilton | ..................... | 718/104 |
| 6,574,336 B1 * | 6/2003 | Kirla | ........................ | 379/406.01 |
| 6,724,736 B1 * | 4/2004 | Azriel | ........................... | 370/286 |
| 7,085,374 B2 | 8/2006 | Schulz | | |
| 2002/0021799 A1 * | 2/2002 | Kaufholz | ................ | 379/406.03 |
| 2003/0223574 A1 * | 12/2003 | Schulz | ..................... | 379/406.01 |
| 2004/0120511 A1 * | 6/2004 | Beaucoup et al. | ....... | 379/406.05 |
| 2007/0165837 A1 * | 7/2007 | Zhong et al. | ............ | 379/406.01 |
| 2007/0254728 A1 * | 11/2007 | Moallemi et al. | ............ | 455/574 |
| 2008/0043824 A1 * | 2/2008 | Jacobs et al. | .................. | 375/220 |
| 2009/0271639 A1 * | 10/2009 | Burge et al. | ................... | 713/300 |

* cited by examiner

*Primary Examiner* — Fan Tsang
*Assistant Examiner* — Jeffrey Lytle
(74) *Attorney, Agent, or Firm* — Muncy, Geissler, Olds & Lowe, PLLC

(57) ABSTRACT

A speakerphone system includes first and second speakerphones connected via a network and a first processor in the first speakerphone and a second processor in the second speakerphone, each of the speakerphones having a first, active, mode for participating in a call with a telephone and a second, idle, mode, wherein, when the first speakerphone is operating in the first mode and the second speakerphone is operating in the second mode, the first speakerphone is adapted to send voice data packets to the second speakerphone, the second speakerphone is adapted to receive voice data packets from the first speakerphone, perform echo cancellation processing on the voice data packets and send the processed voice data packets back to the first speakerphone, and the first speakerphone is adapted to receive the processed voice data packets from the second speakerphone and use the processed voice data packets in the call.

17 Claims, 3 Drawing Sheets

| TELEPHONE | STATUS |
|---|---|
| IP # 1 | EC |
| IP # 2 | EC |
| IP # 3 | EC |
| IP # 4 | EC |
| IP # 5 | EC |
| IP # 6 | EC |
| IP # 7 | IN USE |
| IP # 8 | IDLE |
| IP # 9 | IN USE |
| IP # 10 | IDLE |

METHOD AND SYSTEM FOR DISTRIBUTED SPEAKERPHONE ECHO CANCELLATION

FIELD OF THE INVENTION

The present invention is directed toward a speakerphone system having distributed echo cancellation and toward a method of performing distributed echo cancellation in a speakerphone system, and, more particularly, toward a speakerphone system in which processors of idle speakerphones perform echo cancellation processing for speakerphones that are engaged in a call with another telephone and toward a method of performing such echo cancellation.

BACKGROUND OF THE INVENTION

Telephones having a speakerphone function are well known. Such telephones generally include a microphone and speaker on the telephone body. The speaker allows the voice of other parties on the line to be heard without the use of a telephone handset, and the microphone likewise allows persons in the vicinity of the speakerphone to be heard without speaking into a handset.

One problem that must be addressed in speakerphones is the that of undesirable echoes. One source of echo is the output from the speakerphone speaker—this can be picked up by the speakerphone microphone and sent back to the party at the other end of the line. The speakerphone microphone may be located on the body of the speakerphone a known distance from the speakerphone speaker, and therefore the time delay of this echo is known and the echo is relatively easy to filter. However, echoes can also be caused by indirect reflections of sound from the speakerphone speaker that bounce off walls of the room in which the speakerphone is being used. The delay between the output of the speaker and the receipt of the reflected echo can be unpredictable, and such echoes are more difficult to cancel. Removing these types of echoes is referred to as acoustic echo cancellation. Echo can also be caused by delays and impedance mismatches in a telephone network. This type of echo is referred to as line echo. Both types of echoes may lead to one or both parties to a telephone conversation hearing an annoying hum and/or a delayed repetition of their own voice, and this can be very distracting.

Methods are known for cancelling both types of echoes. However, the filters and algorithms employed for echo cancellation can require significant processing resources in order to be performed in a useful, real-time manner. This is especially true in long delay networks, such as packet-based networks, where echoes may be delayed for several seconds. In traditional echo canceller architecture, the delays in the network are compensated by increasing buffer size and thus memory requirements. Unreliable transport media, such as Internet Protocol networks, have an additional problem of packet loss, which can considerably reduce the effectiveness of an echo canceller. Packet switched networks may thus require even more processing resources.

Voice Over Internet Protocol (VOIP) telephones operate by sending packets of voice data over a network. Each telephone generally includes a processor for handling tasks such as the compression, decompression and packetizing of voice data. To reduce the cost of IP telephones, it is desirable to use general purpose processors in the IP telephones. However, these processors often do not have the processing power to implement echo cancellation, especially in the case of "tails" lasting up to three to four seconds. This problem could be addressed by using more powerful processors in each IP telephone; however, it would be desirable to provide echo cancellation in IP telephones in a manner that allows for the continued use of general purpose processors.

SUMMARY OF THE INVENTION

These problems and others are addressed by embodiments of the present invention, a first aspect of which involves providing a network of a plurality of speakerphones, at least some of which include a processor adapted to perform echo cancellation. The method also includes establishing a call between a first one of the plurality of speakerphones and a telephone, identifying at least one idle speakerphone of the plurality of speakerphones, and using the processor of the at least one idle speakerphone to perform echo cancellation for the call.

Another aspect of the invention comprises a speakerphone system that includes first and second speakerphones connected via a network, the first speakerphone having a first processor and the second speakerphone having a second processor. Each of the first and second speakerphones has a first, active, mode for participating in a call with a telephone and a second, idle, mode. When the first speakerphone is operating in the first mode and the second speakerphone is operating in the second mode, the first speakerphone is adapted to send voice data packets to the second speakerphone, and the second speakerphone is adapted to receive voice data packets from the first speakerphone, perform echo cancellation processing on the voice data packets and send the processed voice data packets back to the first speakerphone. The first speakerphone is also adapted to receive the processed voice data packets from the second speakerphone and use the processed voice data packets in the call.

A further aspect of the invention comprises a method that involves providing a network of a plurality of speakerphones, at least some of the speakerphones including a processor adapted to perform echo cancellation, and establishing a call between a first one of the plurality of speakerphones and a telephone. In addition, the method includes identifying at least one idle speakerphone of the plurality of speakerphones based on user presence information associated with each of the plurality of speakerphones and establishing UDP network socket connections between the first one of the plurality of speakerphones and the at least one idle speakerphone. The method also involves performing echo cancellation on the call by selecting a first time segment of the call, separating the first time segment into a plurality of frequency bands, performing echo cancellation on a first one of the plurality of frequency bands at the first one of the plurality of speakerphones and performing echo cancellation on a second one of the plurality of frequency bands at the at least one idle speakerphone.

BRIEF DESCRIPTION OF THE DRAWINGS

These and other aspects and features of embodiments of the present invention will be better understood after a reading of the following detailed description together with the attached drawings, wherein.

DETAILED DESCRIPTION

Figure 1:
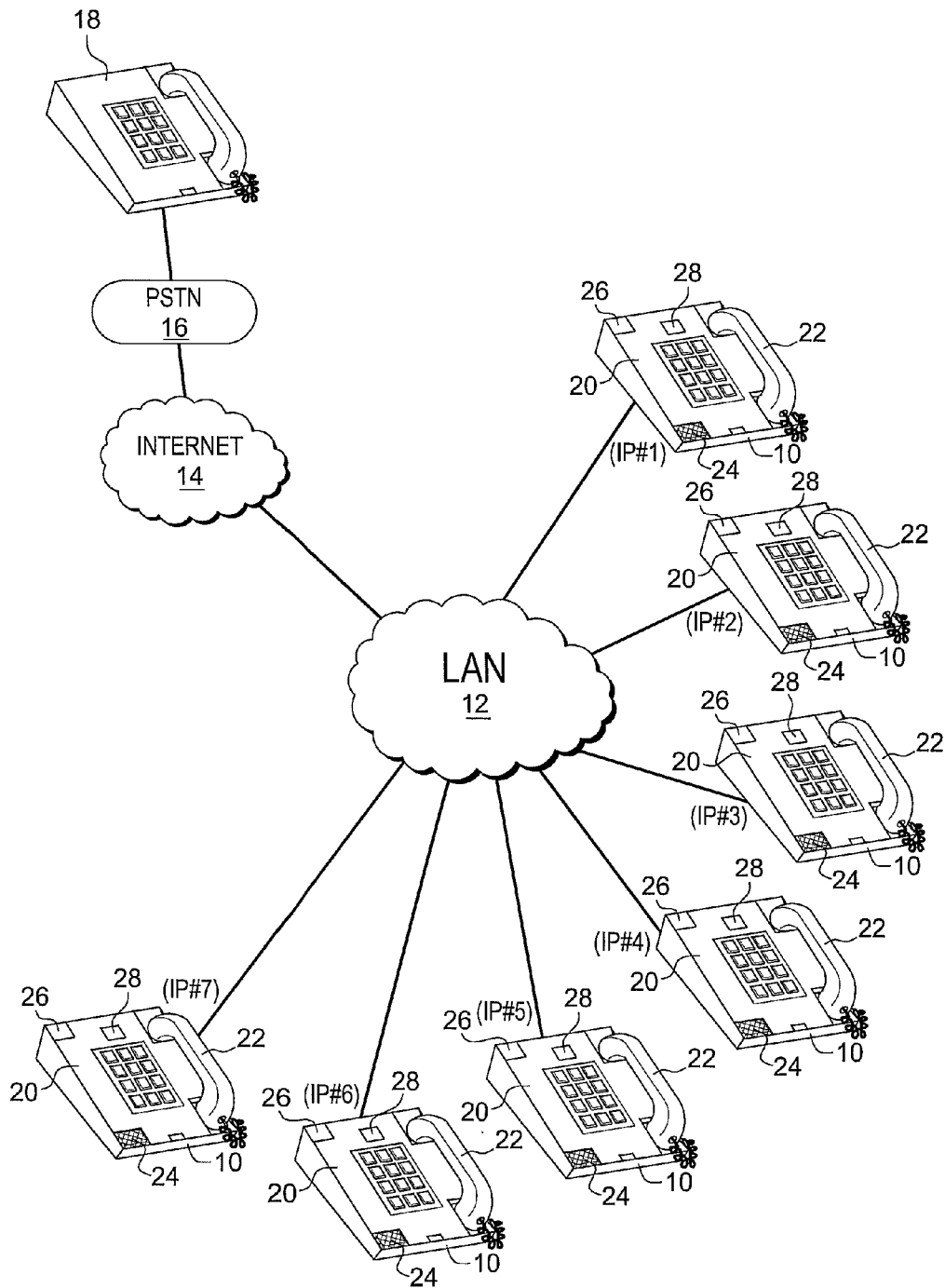
FIG. 1 schematically illustrates a plurality of speakerphones connected to a network.

Referring now to the drawings, wherein the showings are for purposes of illustrating presently preferred embodiments of the invention only and not for the purpose of limiting same, FIG. 1 illustrates a plurality of IP speakerphones 10 connected to a local area network (LAN) 12. LAN 12 is connected to a wide area network (WAN) 14 such as the internet, and the public switched telephone network (PSTN) 16 is reachable via the internet. Telephones 18, one of which is illustrated, are connected to the PSTN. Each of the IP speakerphones 10 connected to LAN 12 has an address, and the seven speakerphones illustrated in FIG. 1 have addresses IP#1-IP#7. Each speakerphone comprises a body 20, a handset 22, a speaker 24, a microphone 26 and a processor 28. The processors 28 of the IP-based speakerphones 10 are configured to break voice data into voice data packets and send the packets over LAN 12 in a well known manner and to receive and reassemble voice data packets received from LAN 12 to produce sounds for a user to hear.

Each of the speakerphones 10 can function as a standard telephone when the handset 22 thereof is used. In addition, a speakerphone function can be enabled, generally by pushing a suitable button (not illustrated), to activate microphone 26 and speaker 24 to allow a person to participate in a telephone call without using handset 22. The operation of IP telephones over a network and the construction of speakerphones are well known to those of ordinary skill in the art and will not be described further herein.

The operation of the subject invention will be described in the context of a telephone call between the speakerphone 10 with address IP#7 and telephone 18. The particular speakerphone 10 being referenced may be referred to hereinafter by its address, e.g., IP#2, alone. A connection is established between speakerphone IP#7 and telephone 18, and the user of speakerphone IP#7 operates the speakerphone in speakerphone mode. To perform the distributed echo-cancellation function of an embodiment of the present invention, IP speakerphone IP#7 receives voice data packets and converts them to audio to be played through the speaker 24 of speakerphone IP#7. However, before playing the audio, it is desirable to perform echo cancellation on the audio packets. If processor 28 in IP speakerphone IP#7 were sufficiently powerful, the echo cancellation could be performed locally at speakerphone IP#7. To allow for the use of less powerful, less expensive processors, the echo cancellation is performed by a plurality of the speakerphones 10 working together, in particular, using idle speakerphones 10 that are not involved in a call and that are not using a significant portion of their processing resources.

Figure 2:
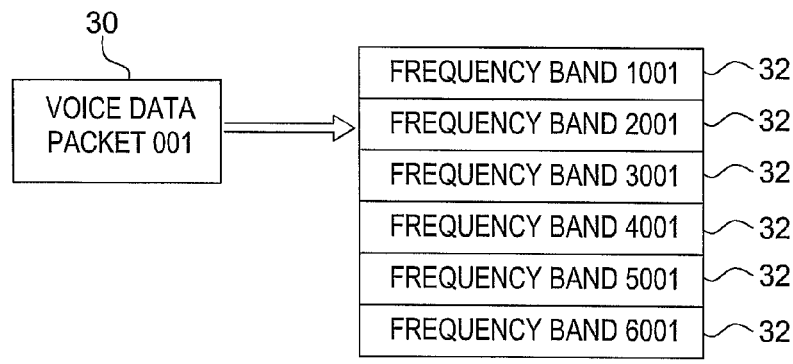
FIG. 2 illustrates a voice data packet being broken into different frequency bands.

A single voice data packet 30 is schematically illustrated in FIG. 2. Processor 28 of IP#7 breaks the voice data packet 30 into a plurality of frequency bands 32; in the present case, six different frequency band 32 are illustrated. The frequency bands 32 are then distributed as packets to a plurality of the IP speakerphones 10 for further processing. The originating IP telephone, IP#7 in this case, may process one or more of the frequency bands itself or it may send all six of the frequency bands to other speakerphones 10 on LAN 12. The distribution is preferably carried out through the use of user datagram protocol (UDP) socket connections with the other speakerphones 10. While UDP is an unreliable protocol that does not guarantee packet arrival, reducing communication time is more important than guaranteeing the receipt of each and every packet. The loss of a small number of packets over LAN 12 will not significantly affect the echo cancellation process.

Furthermore, each of the voice data packets and frequency bands is identified with a sequence number, 001 in the present case, to further distinguish one packet from another and to allow the reassembly of the packets in correct order. While separating the voice data packet 30 into different frequency bands is presently preferred, other methods for separating the voice data packet into smaller units to allow the processing of parts of the voice data packet 30 at other IP speakerphones could also be employed.

Figure 3:
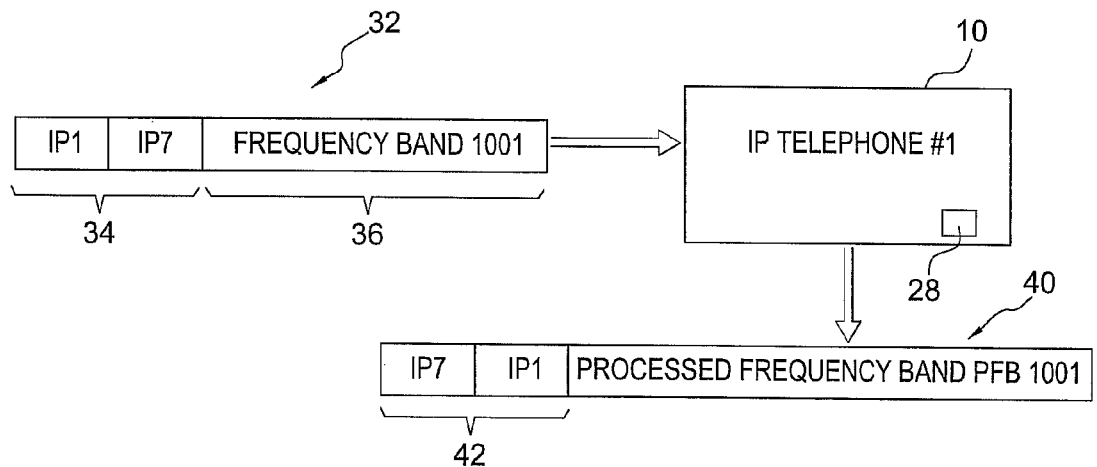
FIG. 3 illustrates one of the frequency bands of FIG. 2 and the processing thereof.

One frequency band 32 from voice data packet 001 is illustrated in FIG. 3 and includes a header section 34 identifying the address of the IP telephone 10 to which the packet is being sent and the address of the IP speakerphone 10 from which the packet originated and to which it needs to be returned. This frequency band 32 further includes a data section 36 carrying the frequency data from the first voice data packet 32. As shown by the header section 34 in FIG. 3, this packet containing frequency band 32 originated from speakerphone IP#7 and is destined for speakerphone IP#1. Echo cancellation processing is carried out by the processor 28 of speakerphone IP#1, and speakerphone IP#1 outputs a processed frequency band (PFB) packet 40 with header information 42 identifying the source of the packet, speakerphone IP#1, and the destination of the packet, speakerphone IP#7.

Figures 4, 5:
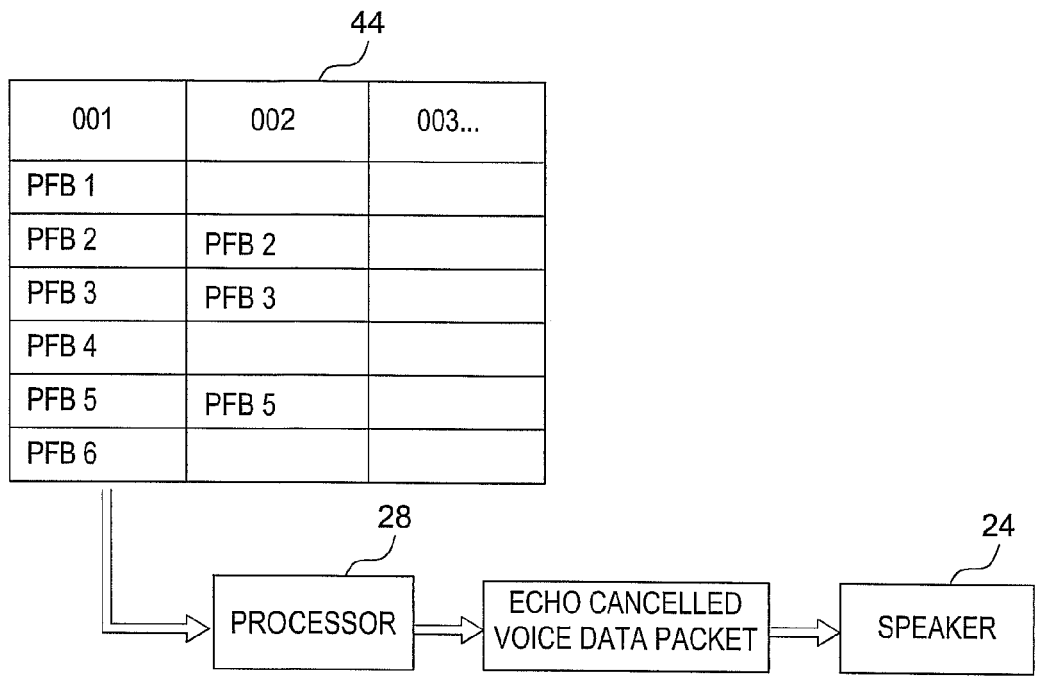
FIG. 4 illustrates processed frequency bands being received at a processor.
FIG. 5 illustrates a status list for a plurality of speakerphones.

The processed frequency bands are received at speakerphone IP#7 and stored in a memory 44, illustrated in FIG. 4, in communication with processor 28 of speakerphone IP#7. When all six processed frequency band data packets 32 making up a particular voice data packet, here voice data packet 001, are received at speakerphone IP#7, they are reassembled and used to produce an audio output from speaker 24 of speakerphone IP#7 in a well known manner. Subsequent voice data packets are processed in a similar manner. In this way, the burden of echo-cancellation processing can be spread among a plurality of idle speakerphones connected to a LAN that are not otherwise using their processing resources. However, because each IP speakerphone requires at least some processing resources, the method and system of the invention advantageously avoids the need for additional processing resources beyond those needed for the normal operation of each speakerphone 10.

In order to take advantage of the processors of idle speakerphones, it is useful for each of the speakerphones 10 to know the status of the other speakerphones in the network. There are various ways to provide such information, such as using a SIP presence server or other network controller that maintains a list of current IP speakerphone statuses. Such a list 50 is illustrated in FIG. 5 and includes the addresses of a plurality of IP speakerphones and their statuses. These statuses are updated periodically as the IP speakerphones establish and break down sessions. The list can be sent to each of the IP speakerphones periodically or each time the list changes when a speakerphone switches between active and idle states. Using this list, the speakerphone in need of echo-cancellation resources can select a number of IP speakerphones to enlist for a given call. In FIG. 5, it can be seen that speakerphones IP#7 and IP#9 (speakerphones IP#8-IP#10 are not illustrated in FIG. 1) are in use, speakerphones IP#8 and IP#10 are idle and speakerphones IP#1 through IP#6 are not engaged in a call but are performing echo cancellation for another speakerphone 10.

In order to simulate local echo cancellation processing, the disclosed system is designed to allow for a five millisecond processing time by the processor of each remote speakerphone 10 and a five millisecond round trip time from the originating speakerphone 10 to the speakerphone doing the processing. A 10 millisecond total delay is short enough that it will not significantly affect the quality of a call over the speakerphone.

In the above example, a sufficient number of idle IP speakerphones 10 were available when speakerphone IP#7 made a call to telephone 18. However, during the course of a call, the owners of the speakerphones performing error processing may pick up their extensions and begin a call of their own. These speakerphones that are now in use no longer have spare processing capacity and will cease performing their echo cancellation functions for speakerphone IP#7. One way to minimize this problem is to identify speakerphones 10 as available only when presence information indicates that the owner of that speakerphone is away from his desk—when he is not logged into a corporate network, for example. Alternately, all idle speakerphones could potentially be made available to a speakerphone requiring assistance with echo cancellation, but priority could be given to speakerphones belonging to individuals who appear to be out of their offices (based on presence information).

If a speakerphone 10 that is being used for echo cancellation becomes unavailable during a call, the echo cancellation being performed by that speakerphone will be lost. At that time, the speakerphone such as speakerphone IP#7 that is engaged in a speakerphone call, may attempt to perform additional error correction locally while it searches for an additional idle speakerphone. If an additional idle speakerphone is located, speakerphone IP#7 establishes a UDP socket connection with that idle speakerphone and uses the new speakerphone in place of the speakerphone that is no longer available.

If no available speakerphones can be found, speakerphone IP#7 can take one of several actions. First, the processor of speakerphone IP#7, realizing that six idle speakerphones are no longer available, may re-divide the voice data packet into a smaller number of larger frequency bands and distribute these frequency bands to the speakerphones that are available. Alternately, the processor of speakerphone IP#7 can determine which frequency band has the least need for echo cancellation and perform echo cancellation only on the remaining bands. Lastly, the speakerphone IP#7 can adjust the type of echo cancellation that is performed so that resources beyond those available from the five or fewer idle speakerphones are not needed.

The present invention has been described herein in terms of preferred embodiments. Modifications and additions to these embodiments will become apparent to those of ordinary skill in the art upon a reading of the foregoing disclosure. It is intended that all such modifications and additions comprise a part of the present invention to the extent they fall within the scope of the several claims appended hereto.

What is claimed is:

1. A method comprising:
   providing a network of a plurality of speakerphones, at least some of the speakerphones including a processor adapted to perform echo cancellation;
   establishing a call between a first one of the plurality of speakerphones and a telephone;
   identifying at least one idle speakerphone of the plurality of speakerphones; and
   using the processor of the at least one idle speakerphone to perform echo cancellation for the first speakerphone.

2. The method of claim 1 wherein the echo cancellation is performed by the processor of the first one of the plurality of speakerphones and the processor of the at least one idle speakerphone.

3. The method of claim 1 wherein said at least one idle speakerphone comprises a plurality of idle speakerphones.

4. The method of claim 3 wherein the echo cancellation is performed by the processor of the first one of the plurality of speakerphones and the processors of the plurality of idle speakerphones.

5. The method of claim 1 including selecting a first time segment of the call, separating the first time segment into a plurality of frequency bands, processing a first one of the plurality of frequency bands at the first one of the plurality of speakerphones and processing a second one of the plurality of frequency bands at the at least one idle speakerphone.

6. The method of claim 5 wherein the at least one idle speakerphone comprises a first number of speakerphones and wherein the plurality of frequency bands comprises a second number of frequency bands, the second number being equal to the first number.

7. The method of claim 5 wherein the at least one idle speakerphone comprises a given number of idle speakerphones and wherein a number of bands in the first plurality of frequency bands is selected to be less than or equal to the given number.

8. The method of claim 1 including establishing user datagram protocol (UDP) network sockets at the at least one idle speakerphone.

9. The method of claim 1 including determining a subset of the plurality of speakerphones as comprising idle speakerphones based on user presence information associated with each of the plurality of speakerphones.

10. The method of claim 1 including maintaining a list of idle speakerphones and updating the list when a speakerphone on the list of idle speakerphones become active.

11. A speakerphone system comprising:
    first and second speakerphones connected via a network;
    a first processor in said first speakerphone and a second processor in said second speakerphone;
    each of the first and second speakerphones having a first, active, mode for participating in a call with a telephone and a second, idle, mode;
    wherein, when the first speakerphone is operating in the first mode and the second speakerphone is operating in the second mode, the first speakerphone is adapted to send voice data packets to the second speakerphone, the second speakerphone is adapted to receive voice data packets from the first speakerphone, perform echo cancellation processing on the voice data packets and send the processed voice data packets back to the first speakerphone, and the first speakerphone is adapted to receive the processed voice data packets from the second speakerphone and use the processed voice data packets in the call.

12. The speakerphone system of claim 11 wherein said first processor is adapted to perform echo cancellation when said first speakerphone is operating in said first mode.

13. The speakerphone system of claim 11 wherein said first processor is adapted to create a voice data packet, divide the voice data packet into frequency bands including first and second frequency bands and send the second frequency band of the voice data packet to the second speakerphone.

14. The speakerphone system of claim 11 including third and fourth speakerphones, wherein said first processor is adapted to create a voice data packet, divide the voice data packet into frequency bands including first, second, third and fourth frequency bands and send the second frequency band of the voice data packet to the second speakerphone, send the third frequency band of the voice data packet to the third speakerphone and send the fourth frequency band of the voice data packet to the fourth speakerphone.

15. The speakerphone of claim 14 wherein said first processor is adapted to receive processed voice data packets from the first, second, third and fourth speakerphones and assemble the frequency bands into an echo-cancelled version of the voice data packet.

16. A method comprising:

providing a network of a plurality of speakerphones, at least some of the speakerphones including a processor adapted to perform echo cancellation;

establishing a call between a first one of the plurality of speakerphones and a telephone;

identifying at least one idle speakerphone of the plurality of speakerphones based on user presence information associated with each of the plurality of speakerphones;

establishing user datagram protocol (UDP) network socket connections between the first one of the plurality of speakerphones and the at least one idle speakerphone; and performing echo cancellation on the call by selecting a first time segment of the call, separating the first time segment into a plurality of frequency bands, performing echo cancellation on a first one of the plurality of frequency bands at the first one of the plurality of speakerphones and performing echo cancellation on a second one of the plurality of frequency bands at the at least one idle speakerphone.

17. The method of claim 16 wherein, if one of said at least one idle speakerphones becomes unavailable, identifying at least one other idle speakerphone and replacing the unavailable one of the at least one idle speakerphones with the at least one other idle speakerphone.

* * * * *